(12) United States Patent
Kamimura et al.

(10) Patent No.: US 8,832,022 B2
(45) Date of Patent: Sep. 9, 2014

(54) TRANSACTION PROCESSING DEVICE, TRANSACTION PROCESSING METHOD AND TRANSACTION PROCESSING PROGRAM

(75) Inventors: Junpei Kamimura, Tokyo (JP); Junichi Tatemura, Cupertino, CA (US); Atsushi Kitazawa, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 13/102,532

(22) Filed: May 6, 2011

(65) Prior Publication Data

US 2012/0284244 A1 Nov. 8, 2012

(51) Int. Cl.
*G06F 17/30* (2006.01)
*G06F 9/46* (2006.01)

(52) U.S. Cl.
CPC .................... *G06F 9/466* (2013.01)
USPC ....................................... 707/609

(58) Field of Classification Search
USPC ....................................... 707/609
See application file for complete search history.

(56) References Cited

U.S. PATENT DOCUMENTS

| 4,507,751 A * | 3/1985 | Gawlick et al. ................. 1/1 |
| 2008/0005112 A1* | 1/2008 | Shavit et al. ................. 707/8 |
| 2011/0252099 A1* | 10/2011 | Pattekar et al. ............... 709/206 |

FOREIGN PATENT DOCUMENTS

| JP | 2011-008451 A | 1/2011 |
| JP | 2011-013923 A | 1/2011 |

* cited by examiner

*Primary Examiner* — Hung Q Pham
(74) *Attorney, Agent, or Firm* — Sughrue Mion, PLLC

(57) ABSTRACT

An object of the present invention is to carry out transaction processing on a plurality of records even in the case the transaction processing is executed in an environment that manages records composed of pairs of keys and values. The transaction processing device of the present invention includes a group information storage unit that stores information relating to transactions, in association with information relating to groups generated by logically grouping records used in the transactions according to attribute values of a unique key common to the records, a group specification unit that specifies the group corresponding to the transaction by referencing the stored information based on the transaction corresponding to a processing request received from the application, a log management unit that manages logs of the records belonging to the specified group by collectively storing all contents of the logs in the physically same storage area, and a data updating unit that updates real data by reflecting the contents of the managed logs in the records corresponding to those logs.

6 Claims, 15 Drawing Sheets

FIG. 2

| PRODUCT TABLE | | | | |
|---|---|---|---|---|
| PRODUCT ID | PRODUCT NAME | INVENTORY | NO. OF BIDS | MAX. MONETARY AMOUNT |
| i1 | AAA | 10 | 5 | 10000 |
| i2 | BBB | 3 | 7 | 8000 |
| i3 | CCC | 5 | 3 | 3000 |

| BID TABLE | | | |
|---|---|---|---|
| BID ID | PRODUCT ID | USER ID | AMOUNT OF BID |
| b1 | i1 | u3 | 9000 |
| b2 | i1 | u1 | 10000 |
| b3 | i3 | u2 | 3000 |
| b4 | i2 | u1 | 8000 |
| b5 | i3 | u3 | 2500 |

FIG. 4

| PRODUCT INFORMATION TABLE | | | | |
|---|---|---|---|---|
| PRODUCT ID | PRODUCT NAME | INVENTORY | TYPE | DEALER |
| i1 | AAA | 10 | HOME APPLIANCE A | XXX |
| i2 | BBB | 3 | INFORMATION DEVICE A | YYY |
| i3 | CCC | 5 | HOME APPLIANCE B | ZZZ |

G1
| i1 | AAA | 10 | 5 | 10000 |

| b1 | i1 | u3 | 9000 |
| b2 | i1 | u1 | 10000 |

FIG. 5B

G2
| i2 | BBB | 3 | 7 | 8000 |

| b4 | i2 | u1 | 8000 |

FIG. 5C

G3
| i3 | CCC | 5 | 3 | 3000 |

| b3 | i3 | u2 | 3000 |
| b5 | i3 | u3 | 2500 |

| i1 | AAA | 10 | 5 | 10000 |
| i1 | AAA | 10 | HOME APPLIANCE A | XXX |

| i2 | BBB | 3 | 7 | 8000 |
| i2 | BBB | 3 | INFORMATION DEVICE A | YYY |

| i3 | CCC | 5 | 3 | 3000 |
| i3 | CCC | 5 | HOME APPLIANCE B | ZZZ |

FIG. 7A

G7
| i1 | AAA | 10 | 5 | 10000 |

| b1 | i1 | u3 | 9000 |
| b2 | i1 | u1 | 10000 |

| i1 | AAA | 10 | HOME APPLIANCE A | XXX |

FIG. 7B

G8
| i2 | BBB | 3 | 7 | 8000 |

| b4 | i2 | u1 | 8000 |

| i2 | BBB | 3 | INFORMATION DEVICE A | YYY |

FIG. 7C

G9
| i3 | CCC | 5 | 3 | 3000 |

| b3 | i3 | u2 | 3000 |
| b5 | i3 | u3 | 2500 |

| i3 | CCC | 5 | HOME APPLIANCE B | ZZZ |

TRANSACTION PROCESSING DEVICE, TRANSACTION PROCESSING METHOD AND TRANSACTION PROCESSING PROGRAM

BACKGROUND

The present invention relates to a transaction processing device, a transaction processing method and a transaction processing program.

So-called clouds using a large number of computers in data centers have recently attracted attention as execution platforms for scalable web applications. Key-value stores (KVS) are known to be one member of the infrastructure of these clouds. KVS are databases that manage records composed of pairs of keys and values. Japanese Patent Application Laid-open No. 2011-8451 discloses a computer system having KVS. In this computer system, KVS is used as a cache device for caching data of a database in a server. Japanese Patent Application Laid-open No. 2011-13923 discloses a database system having KVS. In this database system, a mechanism is disclosed for coupling data by imparting attribute relations among KVS data.

However, in the case of KVS, atomicity is supported for data manipulation of a single record. Thus, in the case of executing transaction processing using KVS, transaction processing must be executed for each record when atomicity is attempted to be secured, thereby reducing processing efficiency.

SUMMARY

With the foregoing in view, an exemplary object of the present invention is to provide a transaction processing device, a transaction processing method and a transaction processing program capable of carrying out transaction processing on a plurality of records even in the case of executing the transaction processing in an environment that manages records composed of pairs of keys and values.

An exemplary aspect of the present invention, a transaction processing device includes a group information storage unit that stores information relating to one or a plurality of transactions executed by an application, in association with information relating to groups generated by logically grouping records used in the transactions according to attribute values of a unique key common to the records, a group specification unit that, upon receiving a processing request from the application, specifies the group corresponding to the transaction by referencing the information stored by the group information storage unit based on the transaction corresponding to the processing request, a log management unit that manages logs of the records included in the group specified by the group specification unit by collectively storing all contents of the logs in the physically same storage area, and a data updating unit that updates real data by reflecting the contents of the logs managed by the log management unit in the records corresponding to those logs.

An exemplary aspect of the present invention, a transaction processing method includes a group information storage step of storing information relating to one or a plurality of transactions executed by an application, in association with information relating to groups generated by logically grouping records used in the transactions according to attribute values of a unique key common to the records, a group specification step of, upon receiving a processing request from the application, specifying the group corresponding to the transaction by referencing the information stored in the group information storage step based on the transaction corresponding to the processing request, a log management step of managing logs of the records included in the group specified in the group specification step by collectively storing all contents of the logs in the physically same storage area, and a data updating step of updating real data by reflecting the contents of the logs managed in the log management step in the records corresponding to those logs.

An exemplary aspect of the present invention, a transaction processing program causes a computer to execute each of the steps included in the above-mentioned transaction processing method.

An exemplary advantage according to the present invention, transaction processing can be carried out on a plurality of records even in the case the transaction processing is executed in an environment that manages records composed of pairs of keys and values.

DESCRIPTION OF THE DRAWINGS

FIG. 2 is a drawing exemplifying the data configuration of a product table;

FIG. 3 is a drawing exemplifying the data configuration of a bidding table;

FIG. 4 is a drawing exemplifying the data configuration of a product information table;

FIGS. 5A, 5B and 5C are drawings for explaining an example of a group configuration;

FIGS. 6A, 6B and 6C are drawings for explaining an example of a group configuration;

FIGS. 7A, 7B and 7C are drawings for explaining an example of a group configuration;

DETAILED DESCRIPTION

The following provides an explanation of preferred embodiments of a transaction processing device, a transaction processing method and a transaction processing program according to the present invention with reference to the appended drawings.

Prior to providing an explanation of the embodiments, an explanation is provided regarding write-ahead logging (WAL). WAL is one of the transaction processing techniques used in typical relational database systems, and consists of writing the contents of alterations into logs (transaction logs) prior to altering the data of a database. WAL is executed while ensuring atomicity, and has the characteristic of writing logs into a permanent storage device. By employing this WAL to transaction processing, the atomicity (A) and durability (D) of transactions, among the ACID properties consisting of atomicity, consistency, isolation and durability, can be realized. In the case of transaction processing employing WAL, two types of data are updated. The first type is updating of logs while the second type is updating of real data. The timing by which these two types of data are written to a permanent storage device differs. Logs are written when a transaction has been committed, while real data is written at the time of a checkpoint. As a result of writing real data at the time of a checkpoint, the number of times a low-speed hard disk typically used as a permanent storage device is accessed can be reduced.

The invention of the present application enables transaction processing for a plurality of records by employing this WAL in an environment that carries out transaction processing using KVS and adding the various mechanisms described below. The following provides an explanation of an embodiment of the invention of the present application having such characteristics.

Figure 1:
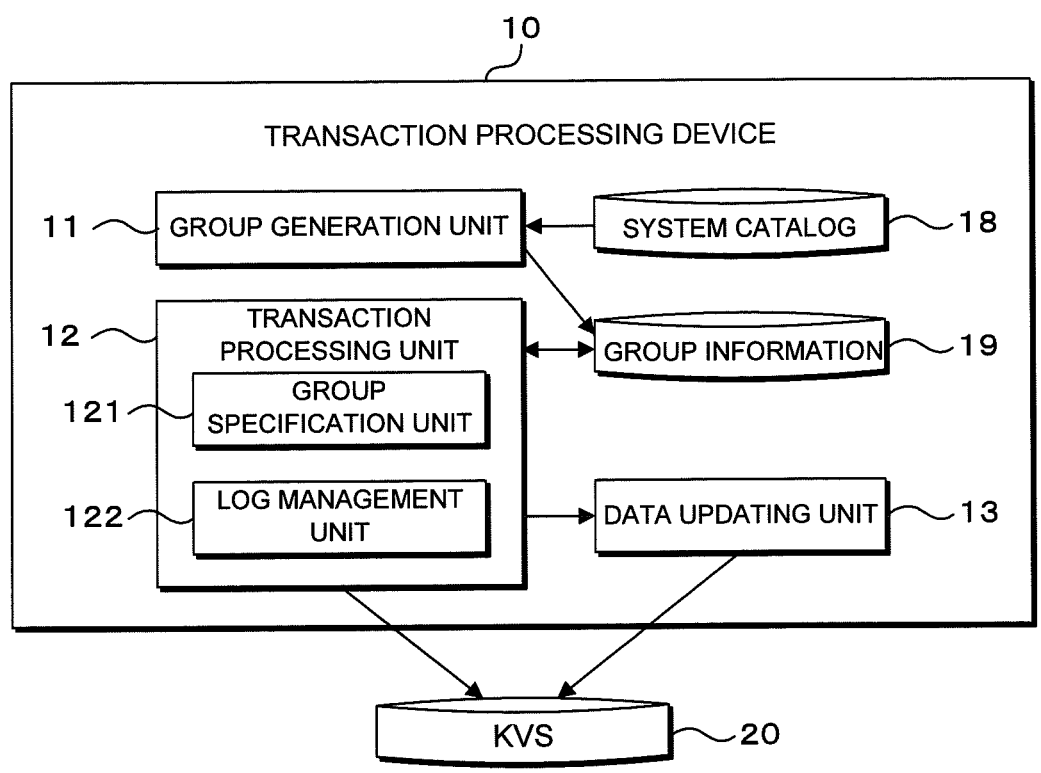
FIG. 1 is a drawing exemplifying the configuration of a transaction processing device in an embodiment.

First, an explanation is provided of the functional configuration of a transaction processing device in an embodiment with reference to FIG. 1. A transaction processing device 10 functionally has, for example, a group generation unit 11, a transaction processing unit 12 and a data updating unit 13.

Here, the transaction processing device 10 is physically composed by including, for example, a central processing unit (CPU), a storage device and an input/output interface. Read only memory (ROM), which stores programs and data processed with the CPU, a hard disk drive (HDD), and random access memory (RAM), which is mainly used as various work areas for control processing, for example, are included in the storage device. These elements are mutually connected via a bus. The functions of each unit of the transaction processing device 10 can be realized by the CPU executing a program stored in ROM, and processing commands received via the input/output interface and data deployed in RAM.

The group generation unit 11 shown in FIG. 1 generates groups by logically grouping records used in transactions for each of one or a plurality of transactions executed by an application. More specifically, groups are generated in the manner described below.

First, the group generation unit 11 receives information relating to a transaction from an application. Continuing, the group generation unit 11 references information relating to the transaction and information stored in a system catalog 18, and selects a unique key common to all records used in the target transaction. Continuing, the group generation unit 11 generates groups by logically grouping records according to attribute values of the selected unique key. Meta information of data stored in a KVS 20 is stored in the system catalog 18. The KVS 20 is a database provided with operational atomicity for a single record and a compare and swap (CAS) command for a single record. The KVS 20 is constructed by being dispersed among a plurality of server devices.

The group generation unit 11 registers group information including information relating to the generated groups and information relating to a received transaction in a group information storage unit 19. The group information storage unit 19 stores the information relating to the transaction in association with information relating to the groups.

Information relating to groups is not necessarily required to include values of each record belonging to a group, and for example, is only required to include attribute values of a unique key and meta information of a table that composes the groups. This is because a target record can be extracted from the KVS 20 provided unique key attribute values and table meta information are obtained.

The following provides a detailed explanation of groups generated by the group generation unit 11 with reference to FIGS. 2 to 7.

The explanation is provided using the following Transaction 1 and Transaction 2 as transactions. Transaction 1 consists of executing processing in which "data of a product table and bidding table are updated when a user newly carries out bidding". Transaction 2 consists of executing processing in which "inventory volume is updated when a product has been sold". In addition, the explanation is provided using a product table T1 shown in FIG. 2, a bidding table T2 shown in FIG. 3 and a product information table T3 shown in FIG. 4 as tables that store data used in transactions.

The group generation unit 11 generates groups corresponding to Transaction 1 in the manner described below. First, the group generation unit 11 specifies that data used in Transaction 1 is data stored in the product table T1 and the bidding information table T2. Continuing, the group generation unit 11 selects a product ID as a unique key common to records containing each data. Continuing, the group generation unit 11 logically groups each record according to attribute values of the product ID. As a result, the group generation unit 11 generates the three groups G1 to G3 shown in FIGS. 5A to 5C. Furthermore, Transaction 1 accesses only one of the groups of the three groups G1 to G3, and does not access a plurality of groups simultaneously.

The group generation unit 11 generates groups corresponding to Transaction 2 in the manner described below. First, the group generation unit 11 specifies that data used in Transaction 2 is data stored in the product table T1 and the product information table T3. Continuing, the group generation unit 11 selects a product ID as a unique key common to records containing each data. Continuing, the group generation unit 11 logically groups each record according to attribute values of the product ID. As a result, the group generation unit 11 generates the three groups G4 to G6 shown in FIGS. 6A to 6C. Furthermore, Transaction 2 accesses only one of the groups of the three groups G4 to G6, and does not access a plurality of groups simultaneously.

Here, the same records are respectively contained in groups G1 and G4, groups G2 and G5 and groups G3 and G6. In such cases, if Transaction 1 and Transaction 2 are executed simultaneously, data inconsistencies can occur when updating data. In order to avoid these inconsistencies, it is necessary to gather data used in both Transaction 1 and Transaction 2 in the same group.

More specifically, the group generation unit 11 generates the three groups G7 to G9 shown in FIGS. 7A to 7C as groups corresponding to both Transaction 1 and Transaction 2. In other words, the group generation unit 11 generates groups according to attribute values of the product ID so that there is no duplication of records between each group. Furthermore, Transaction 1 and Transaction 2 only access any one of the three groups of G7 to G9, and do not access a plurality of groups simultaneously.

Here, logs in the present embodiment retain the latest contents of each record belonging to the same group, and are stored in the KVS 20 separate from actual records. Although the KVS 20 is constructed by being dispersed among a plurality of server devices, the contents of a single log are not stored by being dispersed among a plurality of server devices, but rather are collectively stored in a single server device. In other words, the entire contents of logs generated in group units are collectively and physically stored in the same storage area.

Logs are composed of pairs of keys and values in the same manner as actual records. For example, a log corresponding to group G1 shown in FIG. 5 is generated in the manner described below.

WAL1=(key, value)=(WAL_i1, [{i1, AAA, 10, 5, 10000}, {b1, i1, u3, 9000}, {b2, i1, u1, 10000}, version])

Here, "WAL1" is an identification code that uniquely specifies the log. "Wal_i1", which composes the "key" of "WAL1", is represented by adding "i1", which is an attribute value of the unique key (product ID) to an identifier that indicates that it is a log of WAL. The "{i1, AAA, 10, 5, 10000}, {b1, i1, u3, 9000}, {b2, i1, u1, 10000}", which composes the "value" of "WAL1", consists of the values of each record contained in group G1. A value indicating the current version of "WAL1" is stored in "version", which composes the "value" of "WAL1". When a log is newly generated, a "1" is stored in "version". When a log is updated, the value stored in "version" is incremented.

Similarly, logs corresponding to group G2 and group G3 shown in FIG. 5 are respectively generated in the manner described below.

WAL2=(key, value)=(WAL_i2, [{i2, BBB, 3, 7, 8000}, {b4, i2, u1, 8000}, version])

WAL3=(key, value)=(WAL_i3, [{i3, CCC, 5, 3, 3000}, {b3, i3, u2, 3000}, {b5, i3, u3, 2500}, version])

The transaction processing unit 12 shown in FIG. 1 executes processing in accordance with a processing request received from an application. A query, for example, is included in the processing request. The transaction processing unit 12 includes a group specification unit 121 and a log management unit 122.

In the case of having received a query from an application, the group specification unit 121 references the group information storage unit 19 based on the transaction corresponding to the query, and specifies a group corresponding to that transaction. A transaction corresponding to the query is obtained by specifying to which transaction a series of processing according to the query belong.

The log management unit 122 manages logs of groups specified by the group specification unit 121 by executing a KVS command such as a get command or a CAS command. The following provides a detailed explanation thereof.

In the case a begin command for beginning transaction processing is received from an application, the log management unit 122 transmits to the KVS 20 a get command for acquiring a log of the record used in the transaction. The log management unit 122 temporarily stores the value of "version" included in the acquired log. Here, in the case a log of the record used in the transaction is not present in the KVS 20, the log management unit 122 executes the processing indicated below.

First, the log management unit 122 transmits to the KVS 20 a get command for acquiring the record used in the transaction and acquires that record. Continuing, the log management unit 122 transmits to the KVS 20 a create command for generating a log corresponding to the acquired record, and generates a log in the KVS 20. Continuing, the log management unit 122 transmits to the KVS 20 a get command for acquiring a log of the record used in the transaction, and acquires that log. Continuing, the log management unit 122 temporarily stores the value of "version" included in the acquired log.

Furthermore, when a log is generated in the KVS 20, in the case a log has already been generated by another transaction, log generation is determined to have failed, and the log generated by the other transaction is reacquired.

In the case a query is received from an application, the log management unit 122 updates the value of each record included in a log acquired from the KVS 20 corresponding to the contents of the query. After updating of each record has been completed, the log management unit 122 increments the value of "version" included in the log. The log management unit 122 responds to the application with the results of updating processing.

In the case a commit command for finalizing the update is received from an application, the log management unit 122 updates the log of the KVS 20 using a CAS command. Updating by the CAS command is executed according to the procedure described below.

First, the log management unit 122 compares the value of "version" stored in the KVS 20 with the temporarily stored value of "version" described above. Continuing, the log management unit 122 updates the log of the KVS 20 in the case the compared "version" values are the same, and writing of the log is successful. On the other hand, in the case the compared "version" values are different, the log management unit 122 does not update the log of the KVS 20 and log writing fails. The log management unit 122 responds to the application with the result of the CAS command.

As a result of using a CAS command when updating a log, consistency of log data can be maintained for the previously described reasons. First, in the case the compared "version" values are the same, this means that other transactions have not updated that log. Thus, in this case, data consistency is maintained even if the log is updated. On the other hand, in the case the compared "version" values are different, this means that another transaction has updated the log during the time the transaction was updating the record. Thus, in this case, data consistency is maintained by discontinuing updating of that log.

In the case an end command for terminating transaction processing is received from an application, the log management unit 122 transmits to the data updating unit 13 a reflect command for causing the contents of the logs to be reflected in a record. This reflect command includes the value of the log "key", and the "version" value when that log has been updated by the log management unit 122.

In the case a reflect command is received, the data updating unit 13 updates the record of the KVS 20 using a CAS command with the contents of the log of the KVS 20, and then deletes that log from the KVS 20. More specifically, updating is carried out in the manner described below.

First, the data updating unit 13 acquires a log corresponding to the value of "key" included in the reflect command from the KVS 20. Continuing, the data updating unit 13 compares the "version" value included in the acquired log with the "version" value included in the reflect command. Continuing, in the case the compared "version" values are the same, the data updating unit 13 updates the value of each record included in the log by reflecting in each corresponding record of the KVS 20. The data updating unit 13 then deletes the log from the KVS 20. On the other hand, in the case the compared "version" values are different, the data updating unit 13 does not execute log reflection.

As a result of using a CAS command when updating records, data consistency can be maintained for the reasons previously described. First, in the case the compared "version" values are the same, this means that other transactions have not updated that log. Thus, in this case, data consistency is maintained even if a record is updated with that log. On the other hand, in the case the compared "version" values are different, this means that another transaction has updated the log during the time until the record was updated following completion of that transaction. Thus, in this case, data consistency is maintained by discontinuing log reflection. In this case, log reflection and deletion are executed according to the operating sequence of the other transaction.

Figure 8:
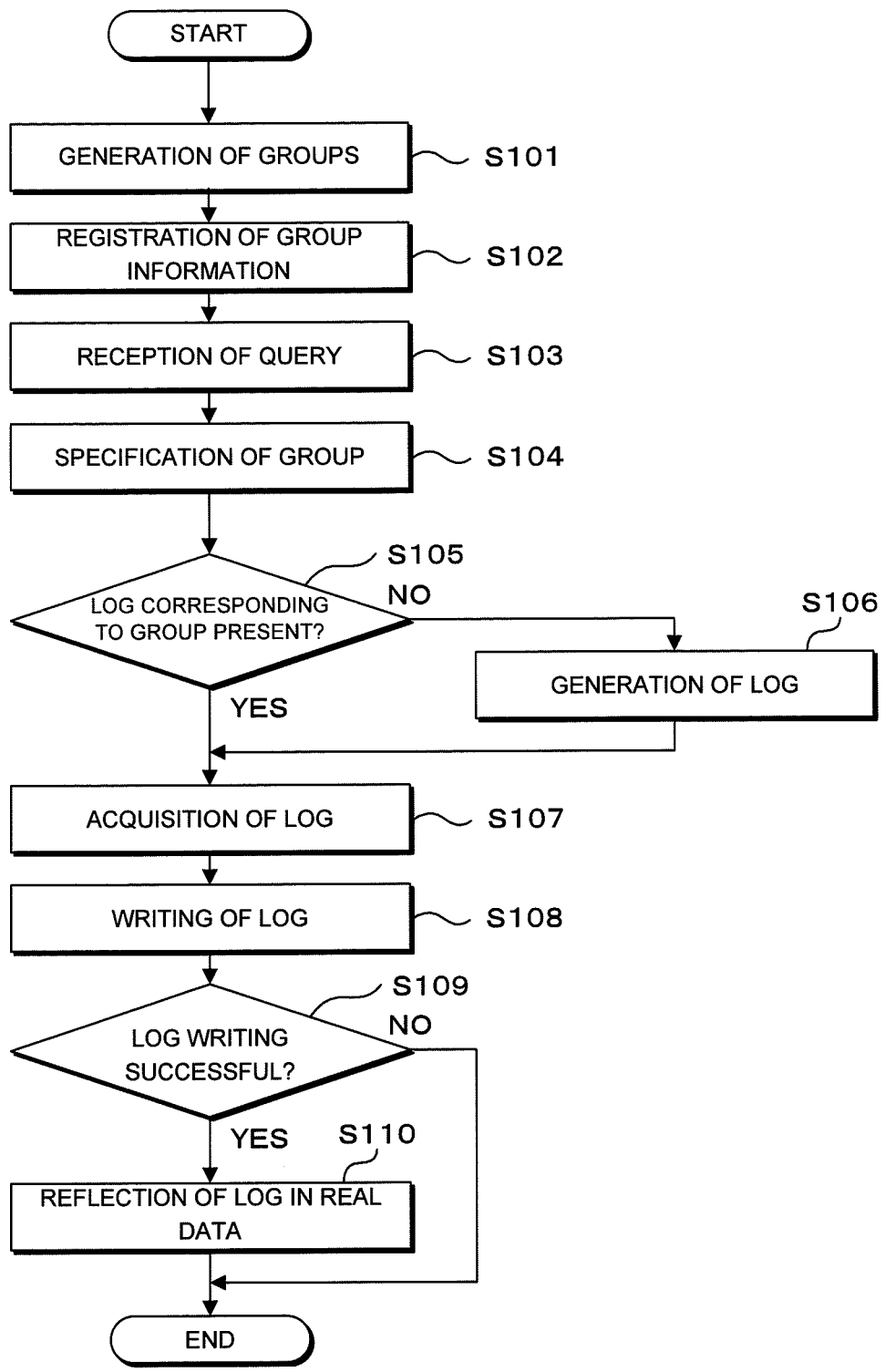
FIG. 8 is a flow chart for explaining the operation of a transaction processing device.

Next, an explanation is provided of the operation of the transaction processing device 10 with reference to FIG. 8.

When information relating to a transaction is input from an application prior to operation of the system, the group generation unit 11 generates groups by logically grouping records used in each transaction according to attribute values of a unique key (Step S101).

Continuing, the group generation unit 11 registers group information that includes information relating to groups and information relating to the transaction in the group information storage unit 19 (Step S102).

Subsequently, after the system has begun to operate, the transaction processing unit 12 receives a query from an application (Step S103).

Continuing, the group specification unit 121 references the group information storage unit 19 based on the transaction corresponding to the received query, and specifies a group targeted for processing (Step S104).

Continuing, the log management unit 122 determines whether or not a log corresponding to the specified group is present in the KVS 20 (Step S105). In the case the result of this determination is NO (NO in Step S105), the log management unit 122 acquires a record corresponding to the group from the KVS 20, generates a log with the acquired record and writes the log to the KVS 20 (Step S106). Processing then proceeds to the subsequently described Step S107.

On the other hand, in the case a log corresponding to the group is determined to be present in the KVS 20 in the determination of Step S105 (YES in Step S105), the log management unit 122 acquires the log from the KVS 20 (Step S107).

Continuing, the log management unit 122 temporarily stores the "version" value of the acquire log, updates the value of each record included in the log, and writes the log to the KVS 20 after incrementing the "version" value (Step S108).

Continuing, the log management unit 122 determines whether or not log writing has been successful (Step S109). In the case the result of this determination is NO (NO in Step S109), operation ends.

On the other hand, in the case log writing has been determined to be successful in the determination of Step S109 above (YES in Step S109), the data updating unit 13 reflect the contents of the log in the real data of the record of the KVS 20 (Step S110) and then deletes that log from the KVS 20. This operation then ends.

Furthermore, in this example of operation, processing for generating and registering group information (Steps S101 and S102) is explained by incorporating in a series of operations for the sake of facilitating the explanation. However, generation and registration of group information is only required to be executed once prior to system operation. Thus, in terms of actual implementation, each of the processing from Step S103 to Step S110 is repeatedly executed as a series of operations following system operation.

Figure 9:
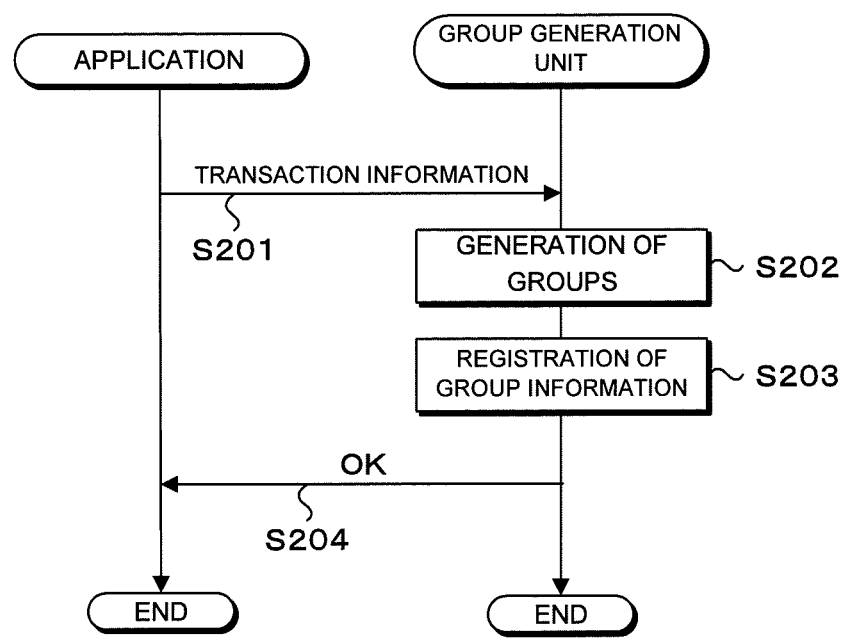
FIG. 9 is a sequence chart for explaining operation when registering group information.

Next, an explanation is provided of operation when registering group information with reference to FIG. 9.

First, information relating to a transaction is transmitted by an application to the group generation unit 11 (Step S201).

Continuing, the group generation unit 11 generates groups based on information relating to the transaction and meta information of data stored in the system catalog 18 (Step S202).

Continuing, the group generation unit 11 registers group information that includes information relating to the generated groups and information to the transaction in the group information storage unit 19 (Step S203).

Continuing, the group generation unit 11 transmits a response to the application indicating that processing has been successful (Step S204).

Next, an explanation is provided of an example of each operation when a transaction updates data of the KVS 20 with reference to FIGS. 10 to 14. In these operation examples, the explanation uses the case in which the executed transaction is a transaction that updates Record 1 and Record 2 stored in the KVS 20.

Figure 10:
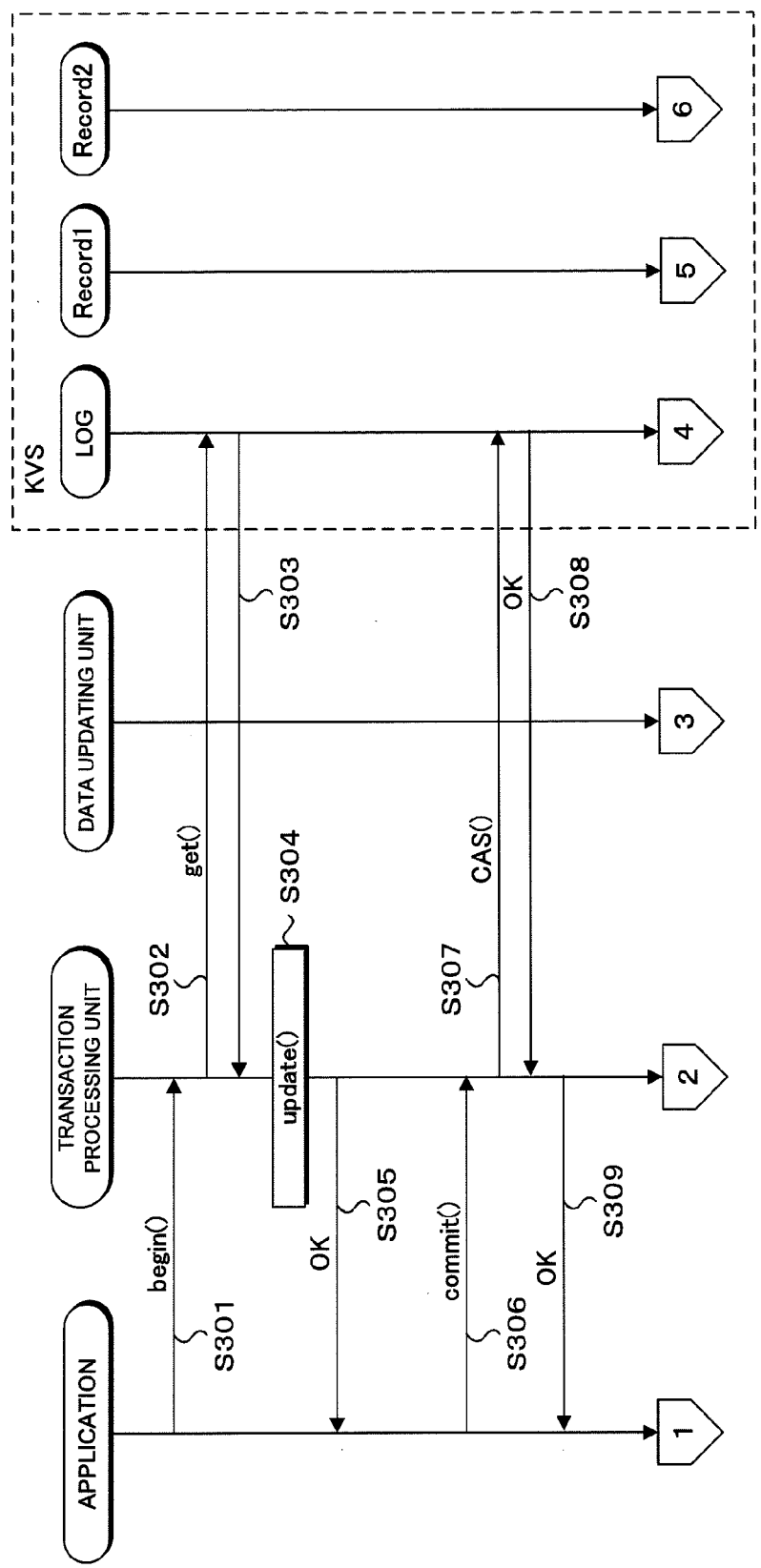
FIG. 10 is a sequence chart for explaining an example of operation when a transaction updates KVS data.
Figure 11:
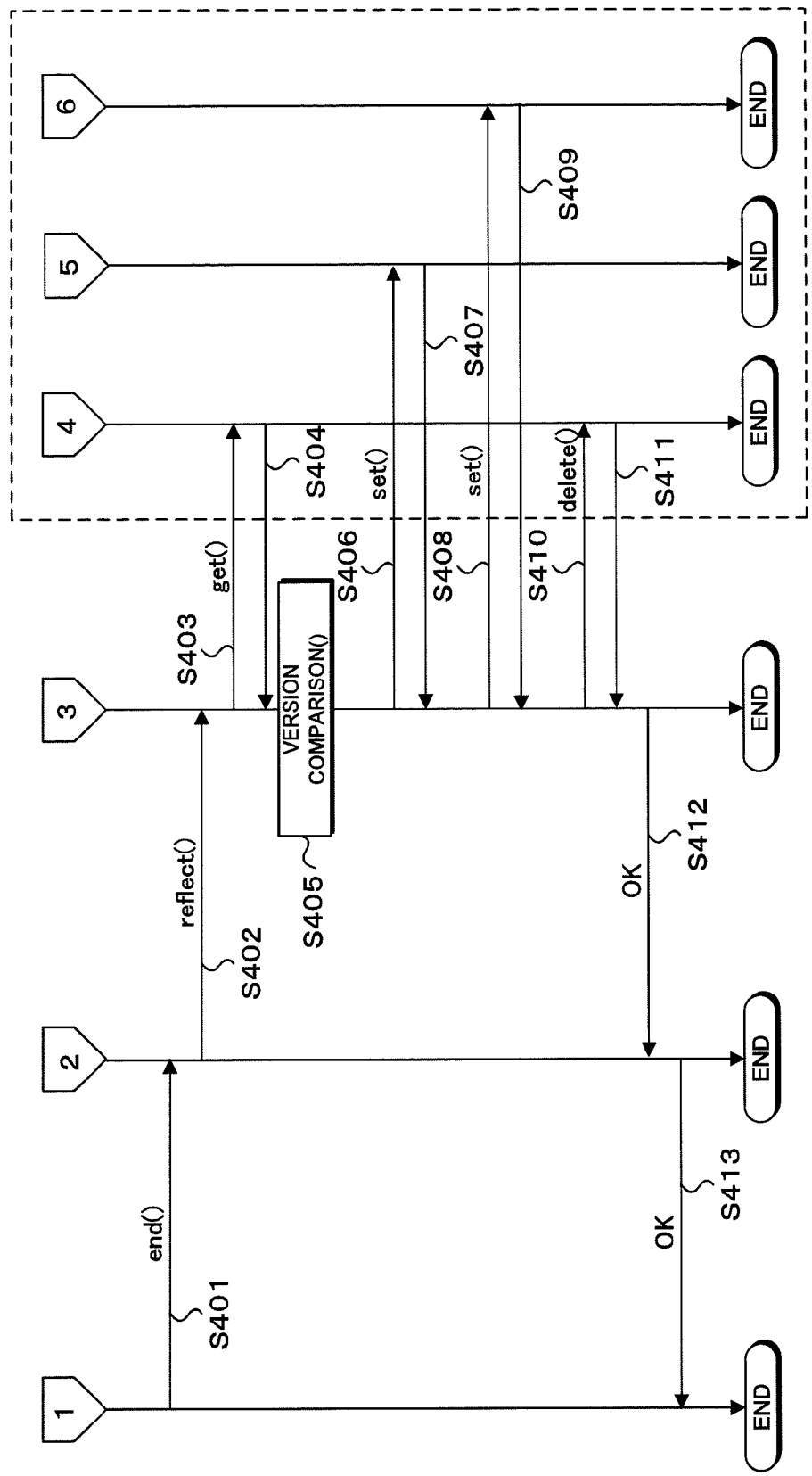
FIG. 11 is a sequence chart for explaining an example of operation when a transaction updates KVS data.

First, an explanation is provided of an example of operation in the case of logs of Record 1 and Record 2 having already been generated in the KVS 20 with reference to FIGS. 10 and 11.

First, an application transmits a begin command to the transaction processing unit 12 to begin transaction processing (Step S301).

Continuing, the transaction processing unit 12 transmits a get command to the KVS 20 (Step S302), and acquires a log from the KVS 20 (Step S303).

Continuing, the transaction processing unit 12 updates the value of each record included in the acquired log according to the query (Step S304). The transaction processing unit 12 then transmits a response to the application indicating that updating was successful (Step S305).

Continuing, the application transmits a commit command to the transaction processing unit 12 to finalize the update (Step S306).

Continuing, the transaction processing unit 12 updates the log using a CAS command (Step S307). If the CAS command is successful (Step S308), the transaction processing unit 12 transmits a response indicating that update was successful to the application (Step S309).

Continuing, the application transmits an end command to the transaction processing unit 12 to terminate transaction processing (Step S401).

Continuing, the transaction processing unit 12 transmits a reflect command to the data updating unit 13 to reflect the contents of the log in the record (Step S402).

Continuing, the data updating unit 13 transmits a get command to the KVS 20 (Step S403) and acquires the log from the KVS 20 (Step S404).

Continuing, the data updating unit 13 compares the "version" value included in the reflect command received from the transaction processing unit 12 with the "version" value included in the log acquired from the KVS 20 (Step S405).

Continuing, in the case the compared "version" values are the same, the data updating unit 13 transmits a set command to the KVS 20 to update Record 1 (Step S406), and receives a response from the KVS 20 indicating that update was successful (Step S407).

Continuing, the data updating unit 13 transmits a set command to the KVS 20 to update Record 2 (Step S408), and receives a response from the KVS 20 indicating that update was successful (Step S409).

Continuing, the data updating unit 13 transmits a delete command to the KVS 20 to delete the log (Step S410), and receives a response from the KVS 20 indicating the deletion was successful (Step S411).

Continuing, the data updating unit 13 transmits a response to the transaction processing unit 12 indicating that the log was successfully reflected in the records (Step S412). The transaction processing unit 12 then transmits a response indicating that processing was successful to the application (Step S413).

Figure 12:
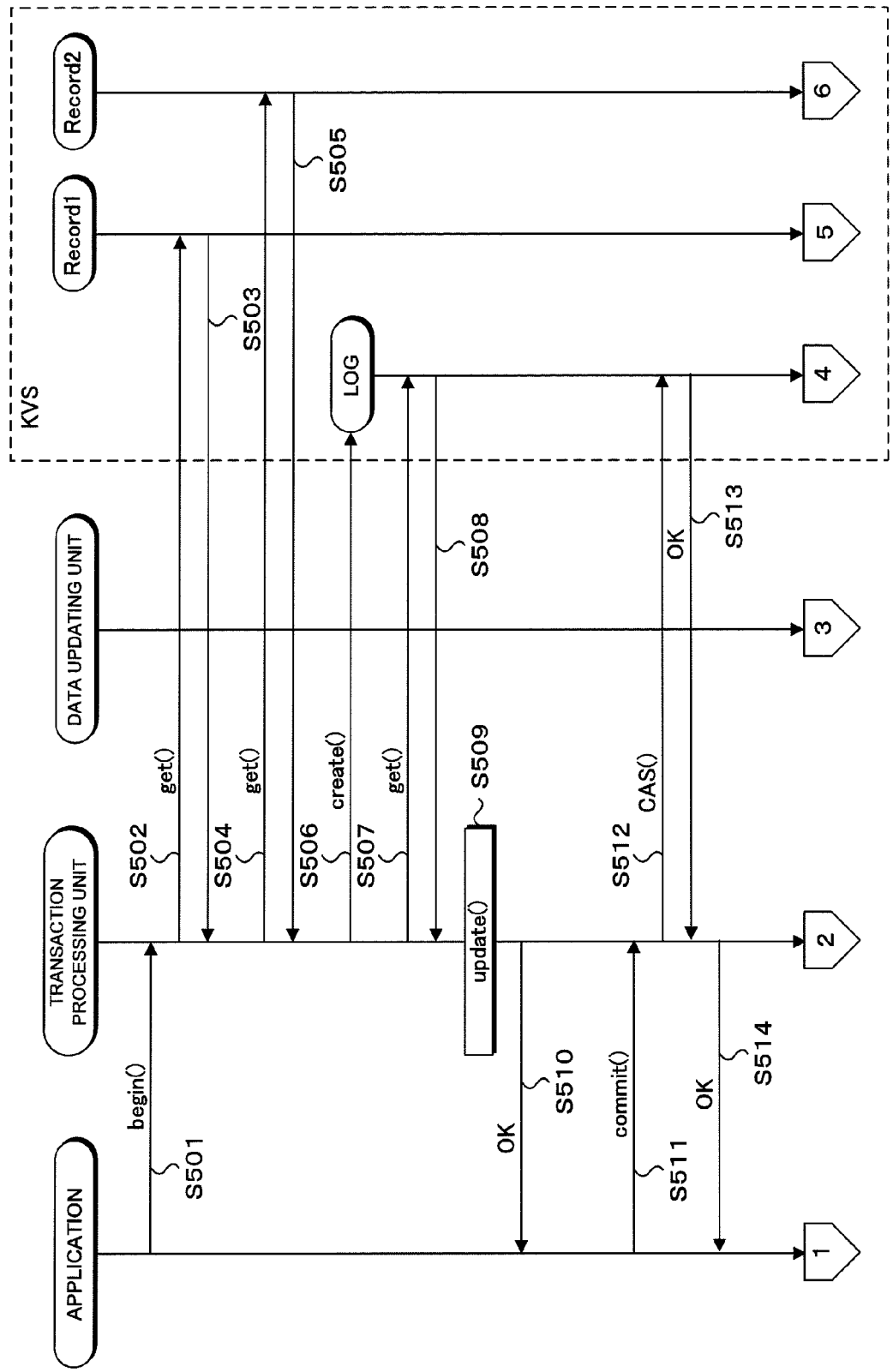
FIG. 12 is a sequence chart for explaining an example of operation when a transaction updates KVS data.

Next, an explanation is provided of an example of operation in the case logs of Record 1 and Record 2 have not been generated in the KVS 20 with reference to FIGS. 12 and 11.

This operation example differs from the above-mentioned operation example of the case of Record 1 and Record 2 having already been generated in the KVS 20 (FIGS. 10 and 11) in that processing from Step S502 to Step S506 is added between the processing of Step S301 and Step S302 shown in FIG. 10. The following provides an explanation focusing primarily on this additional processing.

First, an application transmits a begin command to the transaction processing unit 12 to begin transaction processing (Step S501).

Continuing, the transaction processing unit 12 transmits a get command to the KVS 20 (Step S502), and acquires Record 1 from the KVS 20 (Step S503).

Continuing, the transaction processing unit 12 transmits a get command to the KVS 20 (Step S504), and acquires Record 2 from the KVS 20 (Step S505).

Continuing, the transaction processing unit 12 transmits a create command to the KVS 20 to generate logs for Record 1 and Record 2 (Step S506).

Continuing, the transaction processing unit 12 transmits a get command to the KVS 20 (Step S507) and acquires the logs from KVS 20 (Step S508).

Continuing, the transaction processing unit 12 updates the values of each record included in the acquired logs according to the query (Step S509). The log management unit 122 then transmits a response to the application indicating that updating has been successful (Step S510).

Since processing of the each of the subsequent Steps S511 to S514 is similar to the previously described processing each of the steps of Step S306 to Step S309 shown in FIG. 10, an explanation thereof is omitted. In addition, since the processing of each of the steps of Step S401 to Step S413 of FIG. 11, which are carried out following Step S514, is as was previously explained, an explanation thereof is also omitted.

Figure 13:
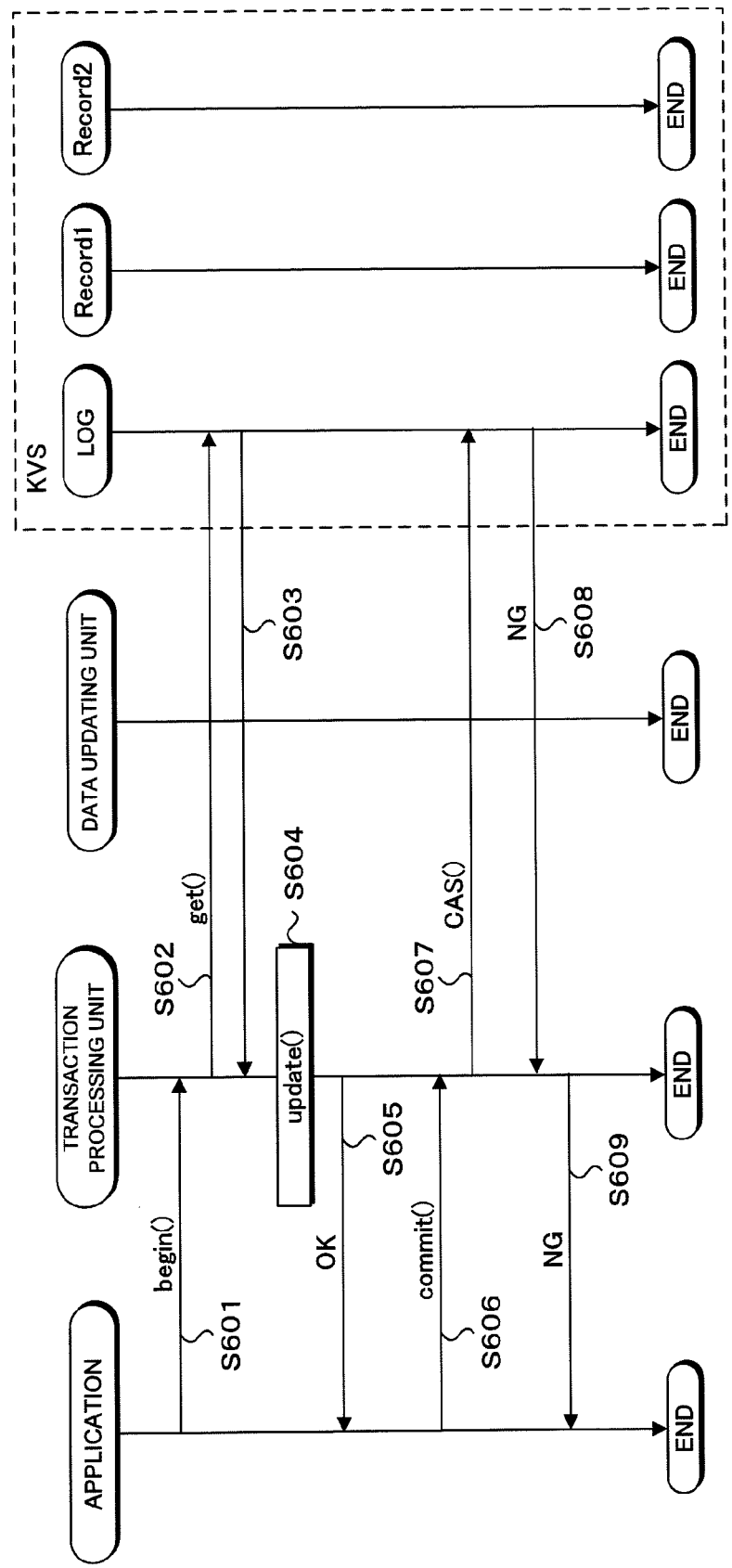
FIG. 13 is a sequence chart for explaining an example of operation when a transaction updates KVS data.

Next, an explanation is provided for an operation example in the case a commit command has failed with reference to FIG. 13. Furthermore, since processing of each of the steps of Step S601 to Step S605 is similar to the previously described processing of each of the steps of Step S301 to Step S305 shown in FIG. 10, an explanation thereof is omitted.

If update is successful in Step S605, the application transmits a commit command to the transaction processing unit 12 to finalize the update (Step S606).

Continuing, the transaction processing unit 12 updates the log using a CAS command (Step S607). If the CAS command fails (Step S608), the transaction processing unit 12 transmits a response to the application indicating that update has failed (Step S609).

Figure 14:
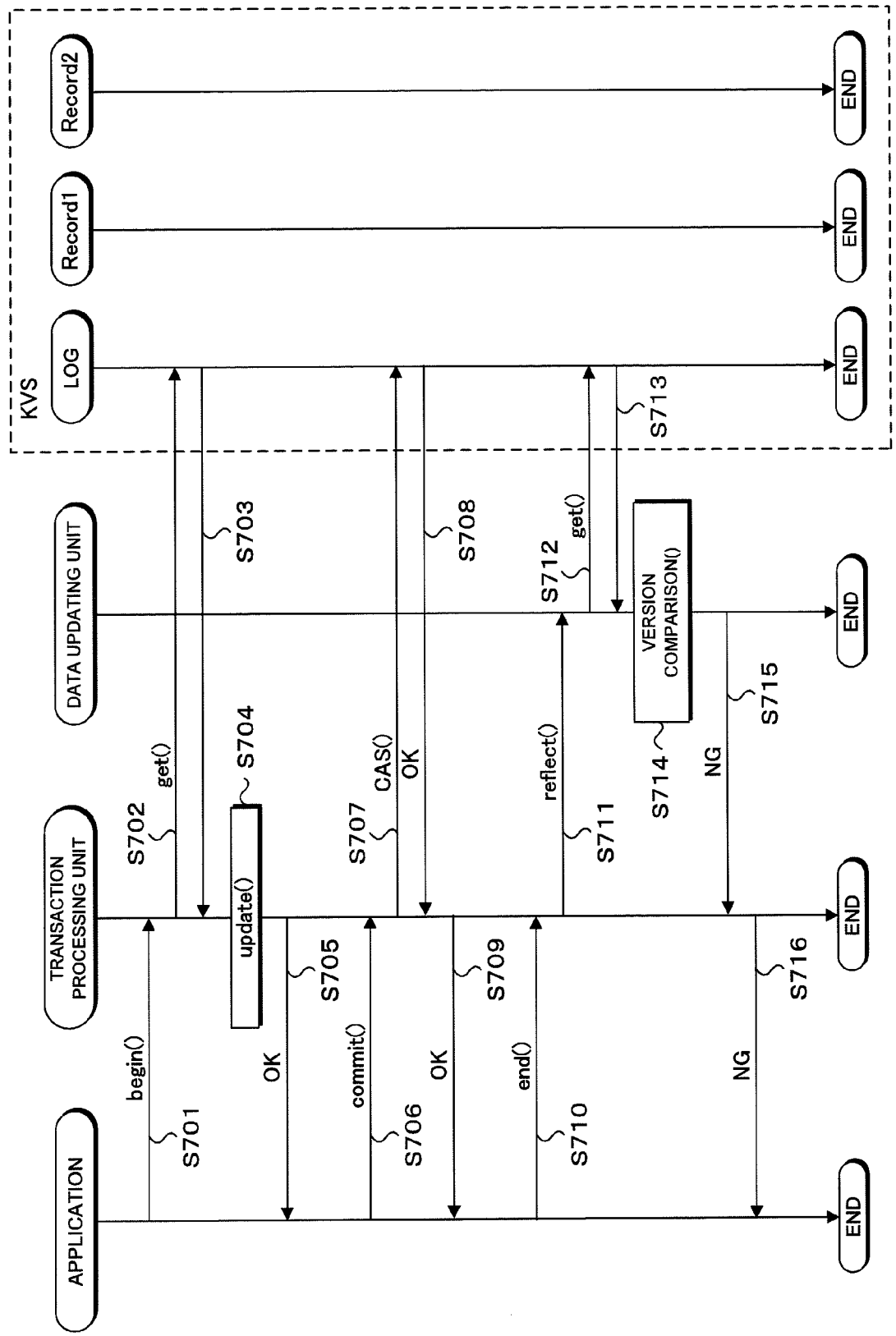
FIG. 14 is a sequence chart for explaining an example of operation when a transaction updates KVS data.

Next, an explanation is provided of an operation example in the case reflecting a log in real data has failed with reference to FIG. 14. Furthermore, since processing of each of the steps of Step S701 to Step S709 is similar to the previously described processing of each of the steps of Step S301 to Step S309 shown in FIG. 10, an explanation thereof is omitted.

If commit is successful in Step S709, the application transmits an end command to the transaction processing unit 12 to terminate transaction processing (Step S710).

Continuing, the transaction processing unit 12 transmits a reflect command to the data updating unit 12 to reflect the contents of the log in a record (Step S711).

Continuing, the data updating unit 13 transmits a get command to the KVS 20 (Step S712) and acquires the log from the KVS 20 (Step S713).

Continuing, the data updating unit 13 compares the "version" value included in the reflect command received from the transaction processing unit 12 with the "version" value included in the log acquired from the KVS 20 (Step S714).

Continuing, in the case the compared "version" values are different, the data updating unit 13 transmits a response to the transaction processing unit 12 indicating the reflection of the log in a record has failed (Step S715). The transaction processing unit 12 then transmits a response to the application indicating that processing has failed (Step S716).

As has been previously described, according to the transaction processing device 10 in the present embodiment, groups can be generated by logically grouping records used in transactions according to attribute values of a unique key command to the records. In addition, logs of records belonging to the same group corresponding to an executed transaction can be processed by collectively storing in the physically same storage area without duplicating. Moreover, actual data can be updated by reflecting contents of managed logs in records stored in physically dispersed storage areas.

For this reason, transaction processing can be carried out on a plurality of records even in the case the transaction processing is executed using KVS.

Furthermore, the previously described embodiment is merely intended to be exemplary, and does not exclude the application of various variations and technologies not clearly indicated in the embodiment. Namely, the present invention can be carried out by being altered to various forms within a range that does not deviate from the gist thereof.

Figure 15:
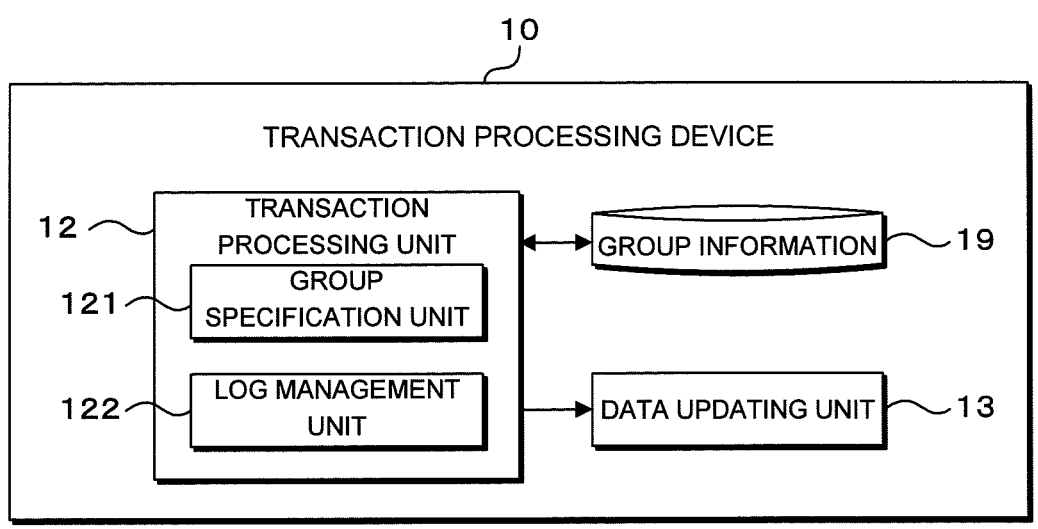
FIG. 15 is a drawing exemplifying the configuration of a transaction processing device of a variation.

For example, although the transaction processing device 10 in the previously described embodiment (see FIG. 1) is provided with the group generation unit 11 and the system catalog 18, it is not limited thereto. As shown in FIG. 15, the transaction processing device 10 may also be provided with the transaction processing unit 12, the data updating unit 13 and the group information storage unit 19. In this case, group information generated by an external device may be stored in the group information storage unit 19.

The whole or part of the exemplary embodiments disclosed above can be described as, but not limited to, the following supplementary notes.

(Supplementary note 1) A transaction processing device including a group information storage unit that stores information relating to one or a plurality of transactions executed by an application, in association with information relating to groups generated by logically grouping records used in the transactions according to attribute values of a unique key common to the records, a group specification unit that, upon receiving a processing request from the application, specifies the group corresponding to the transaction by referencing the information stored by the group information storage unit based on the transaction corresponding to the processing request, a log management unit that manages logs of the records included in the group specified by the group specification unit by collectively storing all contents of the logs in the physically same storage area, and a data updating unit that updates real data by reflecting the contents of the logs managed by the log management unit in the records corresponding to those logs.

(Supplementary note 2) The transaction processing device according to Supplementary note 1, wherein the logs and the records are stored in a key-value store (KVS) physically composed of a plurality of storage areas.

(Supplementary note 3) The transaction processing device according to Supplementary note 2, wherein the log management unit updates the logs using a compare and swap (CAS) command.

(Supplementary note 4) The transaction processing device according to Supplementary note 3, wherein the data updating unit updates the records using a CAS command.

(Supplementary note 5) A transaction processing method, including a group information storage step of storing information relating to one or a plurality of transactions executed by an application, in association with information relating to groups generated by logically grouping records used in the transactions according to attribute values of a unique key common to the records, a group specification step of, upon receiving a processing request from the application, specifying the group corresponding to the transaction by referencing the information stored in the group information storage step based on the transaction corresponding to the processing request, a log management step of managing logs of the records included in the group specified in the group specification step by collectively storing all contents of the logs in the physically same storage area, and a data updating step of updating real data by reflecting the contents of the logs managed in the log management step in the records corresponding to those logs.

(Supplementary note 6) A transaction processing program for causing a computer to execute each of the steps according to Supplementary note 5.

What is claimed is:

1. A transaction processing device, comprising:
a processor and a memory, the memory storing instructions configured the processor to implement:
a group information storage unit that stores information records relating to a plurality of transactions, which are executed by an application, in a plurality of tables, wherein a group generation unit generates a plurality of group of records from the information records which are stored in the plurality of tables, according to a unique key, wherein each information record of the information records which are stored in the plurality of tables can be a member of only one group of records;
a group specification unit that, upon receiving a processing request from the application and based on a transaction corresponding to the received processing request, specifies a group of records by referencing the stored information records to acquire an information record corresponding to the transaction;
a log management unit that generates a log correspondence to received processing request and stores the log in a storage area; and
a data updating unit that updates the information records which are stored in the plurality of tables with content in the stored log.

2. The transaction processing device according to claim 1, wherein the logs and the records are stored in a key-value store (KVS) physically composed of a plurality of storage areas.

3. The transaction processing device according to claim 2, wherein the log management unit updates the logs using a compare and swap (CAS) command.

4. The transaction processing device according to claim 3, wherein the data updating unit updates the records using a CAS command.

5. A transaction processing method causing a processor to execute procedures comprising:
a group information storage step of storing a group information records relating to a plurality of transactions, which are executed by an application, in a plurality of tables, wherein a group generation step generates a plurality of group of records from the information records which are stored in the plurality of tables, according to a unique key, wherein each information record of the information records which are stored in the plurality of tables can be a member of only one group of records;
a group specification step of, upon receiving a processing request from the application and based on a transaction corresponding to the received processing request, specifying a group of records by referencing the stored information records to acquire an information record corresponding to the transaction;
a log management step of generating a log correspondence to received processing request and storing the log in a storage area; and
a data updating step of updating the information records which are stored in the plurality of tables with content in the stored log.

6. A transaction processing program for causing a computer to execute each of the steps according to claim 5.

* * * * *

UNITED STATES PATENT AND TRADEMARK OFFICE
CERTIFICATE OF CORRECTION

PATENT NO. : 8,832,022 B2  Page 1 of 1
APPLICATION NO. : 13/102532
DATED : September 9, 2014
INVENTOR(S) : Junpei Kamimura, Junichi Tatemura and Atsushi Kitazawa It is certified that error appears in the above-identified patent and that said Letters Patent is hereby corrected as shown below:

IN THE CLAIMS:

Column 12, Line 22: In Claim 5, after "storing" delete "a group".

Signed and Sealed this
Thirteenth Day of January, 2015

Michelle K. Lee
*Deputy Director of the United States Patent and Trademark Office*